United States Patent Office 3,427,641
Patented Feb. 11, 1969

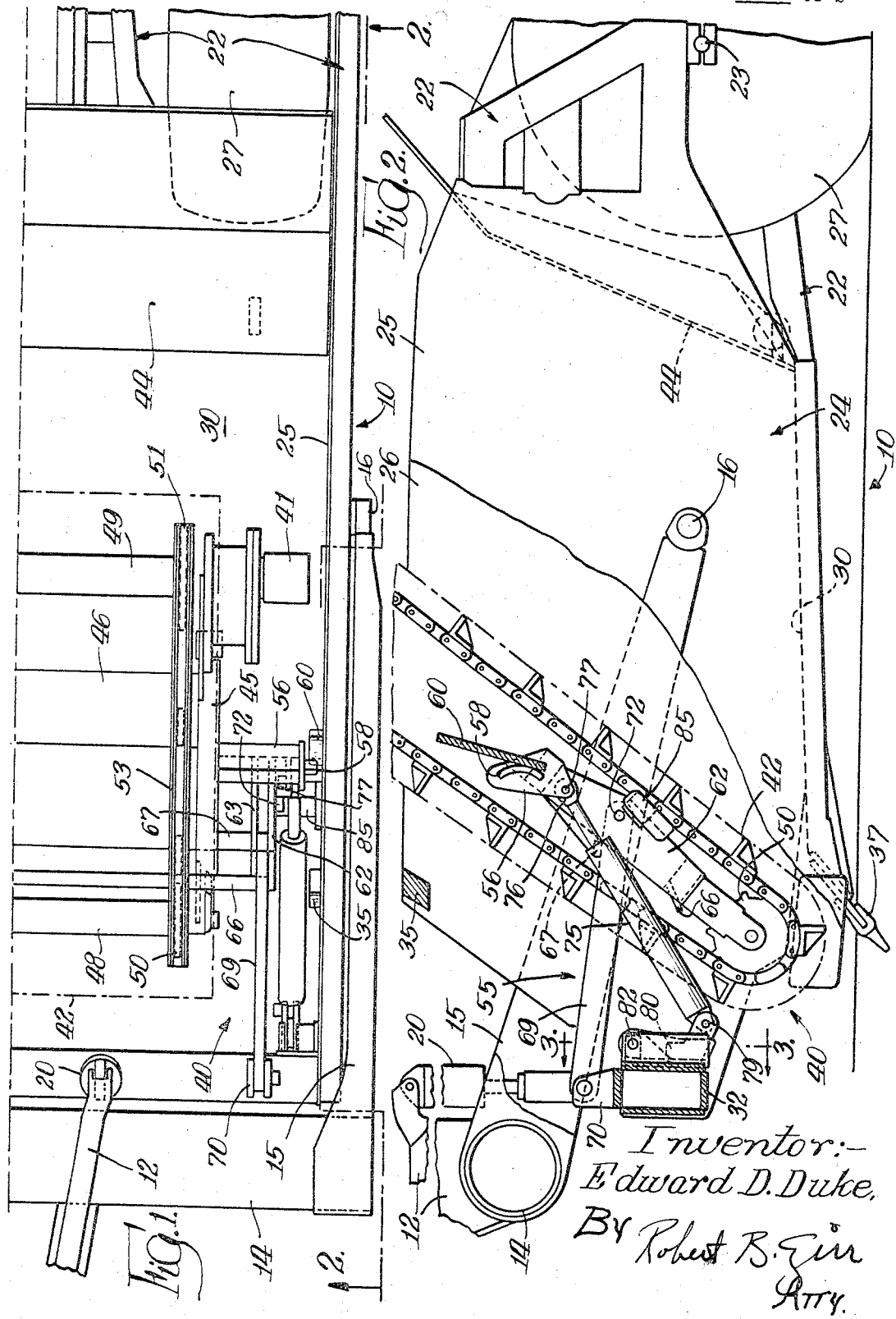

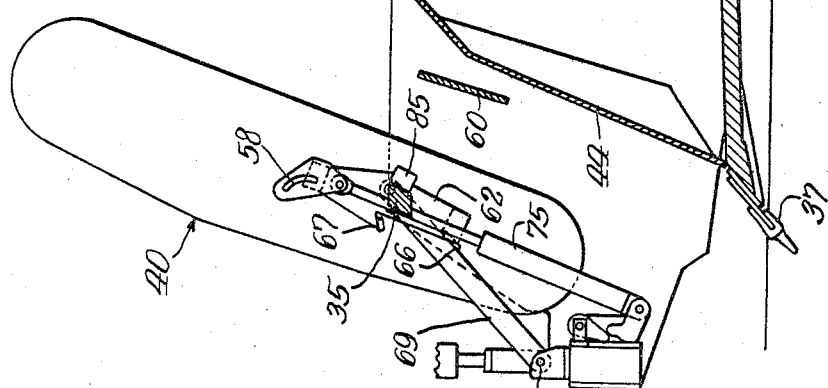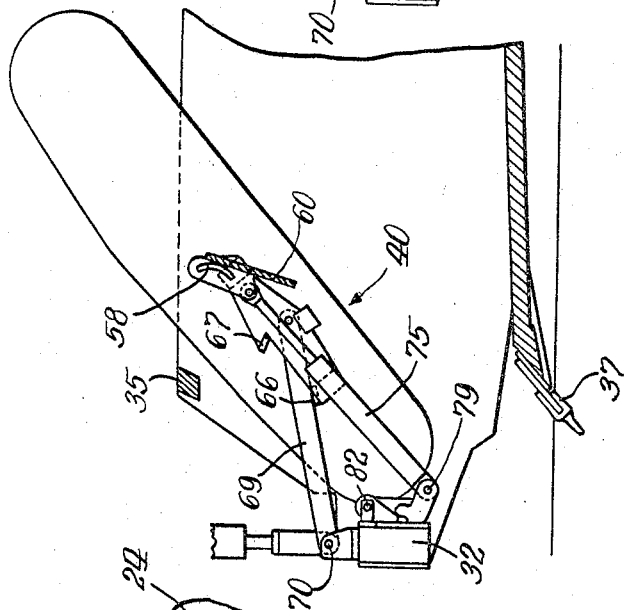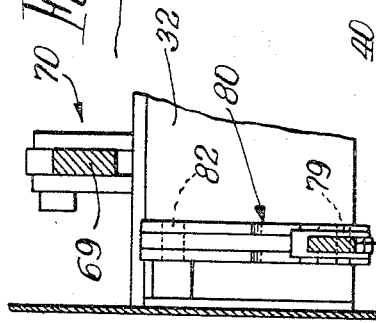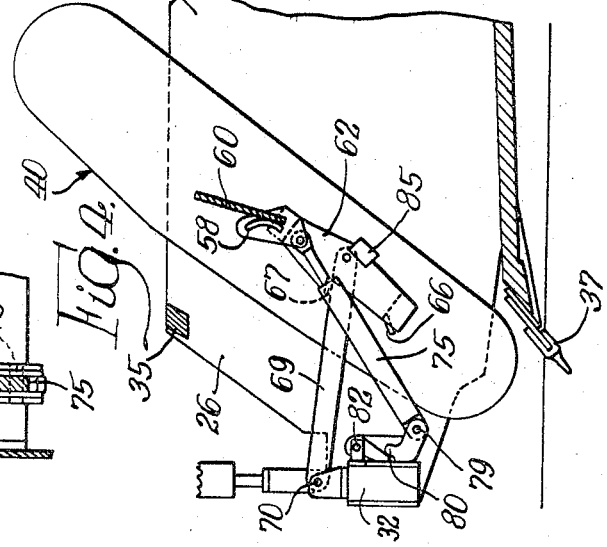

3,427,641
LINKAGE FOR SELF-LOADING
ELEVATOR SCRAPER
Edward D. Duke, Chicago, Ill., assignor to International
Harvester Company, Chicago, Ill., a corporation of
Delaware
Filed July 5, 1966, Ser. No. 562,731
U.S. Cl. 37—8
Int. Cl. E02f *3/62, 3/85;* B60p *1/36*
5 Claims

ABSTRACT OF THE DISCLOSURE

An elevating scraper having a bowl with a cross-member spanning the open end between the side walls and supported from a tractor-towed frame with an elevator mechanism suspended from the cross member by a pair of links, one of which is extensible. The elevator mechanism having a pair of stop means engageable with the non-extensible link to preclude rotation of the elevator mechanism relative thereto at predetermined extensions of the extensible link.

---

This invention relates to material handling scrapers and more particularly to an elevator mechanism for assisting the loading of material in a receptacle commonly referred to as a scraper bowl.

One type of earth moving scraper includes a front open ended bowl having a scraper blade at the forward end of the bowl and wheels at the rear end. The front end of the scraper bowl is connectable to a portion of a tractor which pulls the bowl through a supporting arm commonly referred to as a gooseneck. Suitable hydraulic cylinders are provided for lowering the forward end of the scraper bowl with respect to the tractor so that the blade engages the material beneath the bowl, be it earth, sand, or stone, and as the tractor pulls the scraper the blade forces the material up and into the bowl. After the loading is completed and the bowl is raised the material is transported to another location for unloading.

To assist loading the material in the bowl there have been provided in the past various elevator mechanisms to assist the entry of the material into the bowl thereby expediting the loading operation and improving the efficiency of the scraper. One form of elevator mechanism commonly employed is an endless chain arrangement driven by sprockets with material engaging flanges supported on the chains. This elevator mechanism is positioned with one end adjacent but spaced from the scraper blade and with the other end of the elevator mechanism being positioned high in the scraper bowl somewhat toward the rear of the bowl to facilitate forming a maximum material pile in the bowl.

Most of the scraper bowls of the above described construction employ an ejector mechanism normally positioned at the rear of the bowl during loading for pushing the material out the forward end of the bowl during unloading. During such unloading or ejecting the elevator mechanism must be displaced from its normal loading position adjacent the forward end of the bowl or it will obstruct the unloading operation. Mechanisms have been provided in the past for moving the elevator mechanism from its loading position to positions away from the open end of the bowl. However, these prior constructions have required complex linkage constructions and have in most instances required moving the elevator mechanism a relatively great distance away from the open end to permit unloading, thus, increasing the cost and expense of the operating mechanism as well as degrading the rigidity of the elevator supporting structure due to the necessary length of the linkages to effect this movement of the elevator.

It is, therefore, a primary object of the present invention to provide a new and improved linkage for supporting an elevator mechanism in a scraper bowl and for moving the elevator mechanism from an active position to an inactive position.

Another object of the present invention is to provide a linkage mechanism for an elevator of the type described above of compact design which in moving the elevator from its loading position to its inactive position initially pivots the elevator toward the rear of the bowl, freeing it from any obstructive material adjacent the bottom forward end of the bowl, and for simultaneously translating the elevator mechanism upwardly so that the lower portion of elevator mechanism is spaced a significant distance above the scraper blade, and for thereafter pivoting the entire elevator mechanism in the other direction toward the tractor which serves to move the upper reaches of the elevator mechanism out of the way of the ejector and material as they move forward during unloading.

A further object of the present invention is to provide a new and improved linkage mechanism for supporting and moving an elevator mechanism of the type described above with a floating link arrangement which permits the entire elevator mechanism to be translated upwardly away from the scraper blade in the event that an excessively large obstruction such as a rock attempts to enter the scraper bowl.

A more specific object of the present invention is to provide an operating linkage for an elevator mechanism of the type described above including a main link pivotally connected to the scraper bowl cross-member at the forward end of the bowl and pivotally connected at its other end to the frame of the elevator mechanism; with a hydraulic cylinder pivotally connected to a floating link on the cross-member, said cylinder having an extendable piston rod connected to the elevator frame at a point spaced above the link connection thereto so that as the cylinder is extended from its retracted position the elevator mechanism will pivot toward the rear of the bowl and simultaneously slide up suitable guides formed in the sides of the bowl, there being provided stops on the elevator frame for engaging the main link and limiting this initial pivotal movement of the elevator mechanism about the link; further extension of the cylinder past this point serves to pivot the link and the elevator mechanism as a unit in the other direction toward the tractor, thereby moving the upper end of the elevator mechanism out of the way preparatory to the unloading of the scraper bowl, there being provided further stops on the elevator frame engageable with cooperating stops in the bowl for limiting this final pivotal movement toward the tractor.

Other objects and advantages of the invention will be apparent from the following description taken in connection with the accompanying drawing wherein:

FIG. 1 is a top elevation of one side of a scraper bowl embodying the present invention;

FIG. 2 is a side elevation, partly broken away, of the scraper bowl shown in FIG. 1;

FIG. 3 is a fragmentary cross section taken generally along line 3—3 of FIG. 2 showing a portion of the linkage and, FIGS. 4 to 6 are partial schematic views illustrating the elevator mechanism in its loading, intermediate, and retracted positions, respectively.

While I have shown and described one embodiment of my invention, it is to be understood that it is capable of many modifications. Changes, therefore, in the construction and arrangement may be made without departing from the spirit and scope of the invention defined in the appended claims.

Referring now to the drawings and particularly FIGS. 1, 2, and 3, a scraper generally indicated by the numeral 10 is adapted to be connected to a gooseneck 12 carried by a tractor which pulls the scraper during the loading and transporting operations. The gooseneck 12 has oppositely extending pivots 14 with rearwardly extending arms 15 pivotal on the pivots 14 at one end and pivoted to the opposite sides of the scraper as at 16. For raising and lowering the scraper 10 a hydraulic cylinder 20 is provided fixed to the scraper gooseneck 12 at one end and at the other end to the forward end of the scraper. Extension of the hydraulic cylinder and piston 20 lowers the forward end of the scraper 10 for loading, and retraction of the hydraulic cylinder and piston raises the forward end of the scraper preparatory to transporting the material in the scraper to another location.

The scraper 10 includes frame members 22 carrying an axle 23 at the rear end thereof supporting conventional heavy off-the-road type tractor wheels 27. Mounted on the frame 22 is a bowl 24 for receiving material which includes generally vertical, spaced side walls 25 and 26, and a bottom wall 30 extending between the side walls from the rear of the bowl to the forward end thereof. Note that wall 25 and one of the arms 15 are broken away in FIG. 2 to more clearly illustrate the elevator mechanism. Extending between the forward end of the walls 25 and 26 is a cross-member 32 for rigidly supporting the walls and the forward end of the scraper. Projections 35 extend from the inside walls 25 and 26, as shown in FIGS. 1 and 2, adjacent the upper regions thereof for a purpose described below. A scraper blade assembly 37 extends across and is fixed to the bottom wall 30 of the scraper bowl and serves to enter the material beneath the bowl during loading and lift it up so that it flows into the bowl as the scraper is pulled forward by the tractor.

To assist the entry of material into the bowl 24 an elevator mechanism 40 is provided, shown in its loading position in FIGS. 1 and 2, and includes an endless chain type of material engaging means 42 which travels in a counterclockwise direction assisting the entry of material into the bowl 24 between the scraper blade 37 and the elevator mechanism 40. The elevator extends a substantial distance between the side walls 25 and 26.

An ejector plate assembly 44 is provided and extends between the side walls 25 and 26, shown in FIG. 2 in its retracted position. A suitable hydraulic cylinder operating mechanism (not shown) is provided for moving the ejector plate 44 from its position shown in FIGS. 1 and 2 to a position adjacent the forward end of the bottom 30. To unload material from the bowl 24 the elevator mechanism 40 is raised up and out of the way, and the ejector plate 44 is reciprocated forwardly along the bottom ejecting material from the forward open end of the bowl.

Turning now in more detail to a description of the elevator mechanism 40 along with its associated supporting and retracting mechanism, it should be understood that the top portion of the elevator mechanism 40 is broken away in FIG. 2 for clarity, and that actually it projects in its loading position, a distance of about 25 percent of its length above the top of the bowl 24.

As shown in FIG. 1, the elevator mechanism 40 has spaced frame members 45 (only one shown) connected by a transverse frame member 46. It should be understood that only one-half of the scraper is shown in FIG. 1, and that the opposite side of the scraper is a mirror image of the view shown. Supported between the frame members 45 are spaced shafts 48 and 49 each of which carries a pair of sprockets 50 and 51 at the ends thereof, respectively. Sprockets 50 and 51 are driven by motor means 41. The sprockets 50 and 51 in turn drive endless chains 53 which in turn carry and drive the material engaging means 42, shown only in schematic form in FIGS. 1 and 2 for clarity, and it should be understood that these material engaging means are of conventional design and include a plurality of horizontally extending plates arranged in an endless chain fashion to engage and carry the material entering the bowl over the scraper blade 37 up into the bowl.

Suitable means are provided (not shown) for driving the sprockets 50 and 51 in a counterclockwise direction as shown in FIG. 2.

The operation mechanism 55 for positioning the elevator mechanism 40 is shown in FIGS. 1 and 2 only at one side of the elevator mechanism but as noted above there is an identical operating mechanism at the other side of the elevator mechanism adjacent bowl side wall 26.

Extending transversely from and rigidly connected to the frame members 45 is a support member 56 which terminates just short of the side wall 25. Projecting from the support member 56 is an arcuate guide 58 which slidably engages a cooperating guide 60 fixed to the side wall 25 of the bowl. These guides serve to support the elevator mechanism in the loading position shown and also assist in controlling the movement of the elevator mechanism from the unloading position as will be shown hereinafter.

A pair of spaced supporting plates 62 and 63 are fixed at one end to the support member 56 and carry cross-members 66 and 67 which extend between the plates 62 and 63 and are fixed to the elevator frame means 45. These cross-members serve, respectively, as clockwise and counterclockwise stops for the elevator mechanism 40. For controlling the path of movement of the elevator mechanism a main link 69 is provided pivotally mounted at one end to bosses 70 fixed to the cross-member 32 and at its other end between the plates 62 and 63 by pivot pin 72 extending therethrough.

A hydraulic piston and cylinder device 75 is provided for moving the elevator mechanism 40 from its loading position shown in FIG. 1 to a retracted position shown in FIG. 6. The rod end 76 of the hydraulic piston and cylinder device is pivotally connected to spaced bosses 77 carried by the support member 56. The cylinder end of the hydraulic piston and cylinder device 75 is pivotally connected as at 79 to one end of a floating link assembly 80 carried by bowl cross-member 32. The floating link 80 is pivotally mounted as at 82 to bosses carried by the cross-member 32, and clockwise rotation from its position shown in FIG. 2 is prevented by engagement of the link with the side of the cross-member 32. A cross section of the floating link assembly 80 is shown in FIG. 3. As will appear below, the link 80 permits the elevator mechanism to be raised upwardly if an obstruction is encountered between the blade 37 and the elevator mechanism 40.

The hydraulic piston-cylinder device 75 also serves as a link for controlling the movement of the elevator mechanism. The cylinder end thereof is pivotally mounted at 79 below the link 69 and the rod end is pivotally mounted to the elevator mechanism frame above the pivotal connection of the link 69 thereto. With this arrangement, extension of the hydraulic cylinder 75 tends to cause clockwise rotation, i.e., toward the rear of the bowl, of the elevator mechanism 40 with respect to the link 69, and conversely the retraction of the hydraulic cylinder 75 tends to cause counterclockwise pivotal movement of the elevator mechanism with respect to link 69.

The cross-member and clockwise stop 66 intersects the plane of movement of link 69 and is adapted to engage the link and limit the clockwise rotation of the elevator mechanism 40 with respect to the link 69. Furthermore, as shown in FIG. 2, the cross-member and stop 67 intersects the same vertical plane of movement of link 69 and is engageable therewith to limit the counterclockwise rotation of the elevator mechanism 40 with respect to the link 69. This occurs in the loading position as shown in FIG. 2. Another stop 85, carried by the plate 62, is adapted to engage the bowl projection 35 in the fully retracted position of the elevator position to limit further movement thereof.

For a description of the operation of the elevator operating mechanism, reference will be made to FIGS. 4 to 6. As shown in FIG. 4, the elevator mechanism is in its loading position where it may be activated to assist the entry of material into the bowl. In this position stop 67 engages the link 69 and prevents counterclockwise rotation of the elevator mechanism 40 with respect to the link 69. Clockwise pivotal movement of the elevator mechanism and link 69 is prevented by the guide 58, under the weight of the elevator, engaging the guide 60 on the side of the scraper bowl, thus, securely positioning the elevator mechanism in its loading position.

When it is desired to unload the material from the scraper bowl the elevator mechanism 40 is retracted to its position shown in FIG. 6 by the hydraulic cylinder device 75. For this purpose fluid is ported to the cylinder by a suitable hydraulic control valve (not shown) to begin extension of the same from its retracted position shown in FIG. 4. This causes the guide 58 to slide up the guide 60. As the hydraulic cylinder is in effect a link having an increasing length, this causes pivotal movement of the elevator mechanism toward the rear of the scraper bowl 24 swinging the lower end of the elevator mechanism away from scraper blade 37. During this movement the elevator mechanism pivots clockwise with respect to the link 69 and the link 69 pivots somewhat in a counterclockwise direction. The elevator mechanism 40 continues to pivot clockwise with respect to the link 69 until stop 66 engages the lower surface of the link in the intermediate position shown in FIG. 5. Further extension of the hydraulic cylinder 75 causes the elevator mechanism 40 and the link 69 to be pivoted as a unit in a counterclockwise direction about pivot boss 70 toward the tractor and the position shown in FIG. 6. During this motion the link 69, frame 62 and hydraulic cylinder 75 act like a toggle mechanism to maintain the stop 66 in engagement with the bottom of the link 69. Counterclockwise pivotal movement of the elevator mechanism and link 69 about boss 70 continues until stop 85 engages the bowl projection 35 and this limits the movement of the elevator mechanism in the retracted position.

The arrangement of link 69 and cylinder device 75 is advantageous as it permits the use of simple short linkages which initially pivot the lower end of the elevator mechanism directly away from the blade 37 so that retraction is not hindered by any material in the bowl, and thereafter pivots the elevator mechanism to an upright position in the opposite direction so that it is spaced far from the material in the bowl and does not interfere with either the ejector mechanism or any of the bowl frame structure.

If an obstruction such as a large rock were to attempt to enter the bowl over the blade 37 with the elevator in its loading position shown in FIG. 4, it will strike the elevator mechanism 40 and cause it to slide upwardly along the fixed guides 60 with the floating link pivoting counterclockwise about pin 82. This prevents damage to the elevator supporting mechanism by large obstructions and permits a relatively close spacing of the elevator mechanism with respect to the scraper blade so that it maximizes the usefulness of the elevator in assisting the loading of material into the bowl.

I claim:

1. A bowl for a material loading and transporting scraper comprising: a bottom wall; side walls extending upwardly from said bottom wall; said bowl having a forward open end; a scraper blade on said bottom wall adjacent said open end; a cross frame member between said side walls adjacent said forward end; ejection means for pushing material in said bowl out the forward open end during unloading; an elevator mechanism for assisting the entry of material into the bowl during loading including spaced frame elements, spaced sprockets rotatably mounted in said frame elements, endless chain means surrounding said sprockets, material engaging members carried by said endless chain means, means for rotating said sprockets to drive said material engaging members; and operating means for moving said elevator means from an active position adjacent said open end for loading to an inactive position spaced from said open end for unloading including link means pivotally connected at one end to said frame member and at the other end to said frame elements, means for pivoting said link means including extendable hydraulic piston and cylinder means connected at one end to said frame member and at the other end to said frame elements, said piston and cylinder means connected to said frame elements above the pivotal interconnection between said link means and said frame elements so that the elevator means pivots toward a horizontal position to facilitate the movement of the elevator from adjacent the bottom of the bowl, a fixed guide adapted to be mounted in said bowl, a cooperating guide on said frame elements slidably engaging said fixed guide for restraining the initial pivotal movement of said frame elements with respect to said link means as the elevator means moves from the active position toward the inactive position, stop means on said frame elements engageable with said elevator means for limiting pivotal movement of said frame elements about said link means in a first direction, second stop means on said frame elements engageable with said link means for limiting pivotal movement of said frame elements about said link means in the other direction, third stop means on said frame elements for arresting the elevator means at said inactive position, fixed stop means adapted to be mounted on said bowl selectively engageable by said third stop means, and means permitting movement of said elevator means from said active position to said inactive position upon the entry of an obstruction between said bowl bottom and the elevator, said means for permitting movement of said elevator means including a floating link pivotally connected at one end to said piston and cylinder device and at the other end to said frame member, and means engageable with said floating link for preventing rotation of said link in one direction, said floating link being positioned so that it remains substantially stationary during normal movement of said elevator means by said piston and cylinder device.

2. In a scraper having a bowl with side walls, a crossmember secured between the side walls and supported from a tractor-towed frame means, and a power-driven elevator including a frame member; the improvement comprising: a first link pivotally connected between the elevator frame and the cross member; a second extensible link pivotally connected between the elevator frame and the cross-member; a first stop on the elevator frame between the cross-member and the point of pivotal attachment of said first link to said frame and engageable with the first link upon collapse of said second link to support the elevator for loading the bowl, whereby the weight of said elevator is carried by said cross-member.

3. In a scraper according to claim 2 and further comprising: a guide member on said bowl; a cooperating member carried by said frame, and slidably engageable with said guide; whereby the rate of movement of the lower end of said elevator toward the tractor is controlled a said second link is extended.

4. In a scraper according to claim 3 and further comprising: a second stop means affixed to said frame and engageable with the first link to preclude further rotation of said frame relative to the first link upon reaching a predetermined extension of said second link.

5. In a scraper according to claim 4 and further comprising: a third stop means carried by said bowl and engageable with said frame to limit the movement of said frame upon extension of said second link.

(References on following page)

References Cited

UNITED STATES PATENTS

| | | | |
|---|---|---|---|
| 3,191,322 | 6/1965 | Johnson et al. | 37—8 |
| 3,208,165 | 9/1965 | Johnson et al. | 37—8 |
| 3,210,868 | 10/1965 | Liess | 37—8 |
| 3,292,278 | 12/1966 | Johnson | 37—8 |
| 3,334,428 | 8/1967 | Rezabek | 37—8 |

WILLIAM B. PENN, *Primary Examiner.*

EUGENE H. EICKHOLT, *Assistant Examiner.*